INVENTORS
GEORGES VENDRYES
CASIMIR ZALESKI
BY Bacon & Thomas
ATTORNEYS

Sept. 26, 1967    G. VENDRYES ET AL    3,344,032
FAST NEUTRON REACTOR

Filed Aug. 24, 1965    3 Sheets-Sheet 3

INVENTORS
GEORGES VENDRYES
CASIMIR ZALESKI
BY Bacon & Thomas
ATTORNEYS

United States Patent Office 3,344,032
Patented Sept. 26, 1967

3,344,032
FAST NEUTRON REACTOR
Georges Vendryes, Paris, and Casimir Zaleski, Aix-en-Provence, France, assignors to Commissariat a l'Energie Atomique, Paris, France
Filed Aug. 24, 1965, Ser. No. 482,149
Claims priority, application France, Aug. 27, 1964, 986,391
6 Claims. (Cl. 176—18)

The present invention is concerned with a method of operation of a fast neutron reactor and also with a reactor designed for operation in accordance with said method.

The object of this invention is to ensure uniform distribution of specific power within the reactor core while at the same time permitting effective cooling of all the fuel assemblies which constitute said reactor core.

In fast neutron reactors of the prior art, considerable variations in neutron flux within the reactor core are in fact observed. The neutron flux can be up to seven times higher at the center of the reactor core than at the periphery in the case of cores of substantial volume. The ratio of maximum specific power to mean specific power can in that case attain 2 to 3, with the result that the mean specific power is relatively low whilst the cost of fabrication of fuel elements is high since the constant diameter of said fuel elements is calculated on the basis of maximum specific power.

The term "fuel" as used in this context is understood to designate a material which contains fissionable atoms as opposed to the essentially fertile material which constitutes the breeder blanket of a converter reactor.

In order to flatten this distribution of specific power, recourse can be had to two different methods which ensure constant diameter of the fuel pins constituting the reactor core.

In accordance with the first method, it is possible to make use of a fuel which is more rich in fissionable nuclei in those regions in which it is desired to increase the specific power, namely at the periphery of the reactor core. The second method consists in increasing the proportion of fuel per unit volume in the regions just referred-to whilst the composition of the fuel remains constant.

The solution which consists in producing a variation in fuel enrichment gives rise to problems, particularly in regard to reactivity variation and spatial distribution of heat sources as a function of irradiation time.

The method of operation and the nuclear reactor in accordance with the invention make use of the second solution by producing a variation in the volumetric proportion of fuel whilst the fuel enrichment remains constant.

Contrary to the first method mentioned above, the second method makes it possible to obtain a local internal conversion coefficient which is practically uniform and does not entail any discontinuity in neutron-flux variations. On the other hand, the second method does raise problems in connection with cooling since the space available for the circulation of the coolant fluid is small in those regions in which the proportion of fuel is increased.

The invention makes it possible to overcome this disadvantage.

Accordingly, the invention proposes a method of operation of a fast-neutron reactor which consists in dividing the reactor core into at least two regions having symmetry of revolution with respect to a common axis parallel to the direction of flow of a coolant within the reactor core, characterized in that said regions are occupied by fuel containing the same amount of fissionable material whilst the proportion of fuel per unit volume is different from one region to another and higher in the outermost region, and in that said method consists in cooling the core by circulating the coolant at a different velocity from one region to the other and at a higher velocity in the outermost region.

The variation in velocity of the coolant fluid is preferably obtained by establishing the same pressure throughout all regions on the downstream side of the reactor core and pressures which are different from one region to another on the upstream side of the reactor core.

The invention also proposes a fast neutron reactor comprising a core divided into at least two regions having symmetry of revolution with respect to a common axis which is parallel to the direction of flow of a coolant within the reactor core and a coolant circuit which comprises a heat exchanger and which connects the downstream side to the upstream side of the reactor core, characterized in that said regions are occupied by fuel containing the same amount of fissionable material whilst the proportion of fuel per unit volume is different from one region to another and higher in the outermost region and in that said reactor further comprises means for producing a difference in coolant pressure between the upstream side and downstream side of the reactor core which is different from one region to the other and at maximum value in the outermost region.

In order to prevent unnecessarily high fuel fabrication costs which increase with the variety of assemblies which are fabricated, and also in order to avoid undue complexity of the coolant circuit, it is preferable to make provision for only two different regions in the reactor core. The relative volumes of these two regions are suitably chosen in such manner as to obtain a flattening of the distribution of optimum specific power. However, it is advisable to limit the proportion of fuel per unit volume in the outer region to a value such that it does not call for an unduly high coolant flow velocity in this region.

In accordance with a preferred form of embodiment of the nuclear reactor according to the invention, the coolant is supplied to the reactor core through two coaxial ducts at a different pressure, one duct being assigned to the inner region and the other to the outer region, and the coolant is discharged from the reactor core through a conduit which is common to both regions in order to ensure the same pressure on the downstream side of the reactor core.

In the case of a converter reactor, the core of which is surrounded by a blanket of fertile material, the coolant duct which supplies the inner region can also supply the radial blanket.

There now follows below a description which is given by way of non-limitative example and which relates to one particular form of embodiment of the reactor in accordance with the invention, reference being made to FIGS. 1 to 5 of the accompanying drawings.

Figure 1:
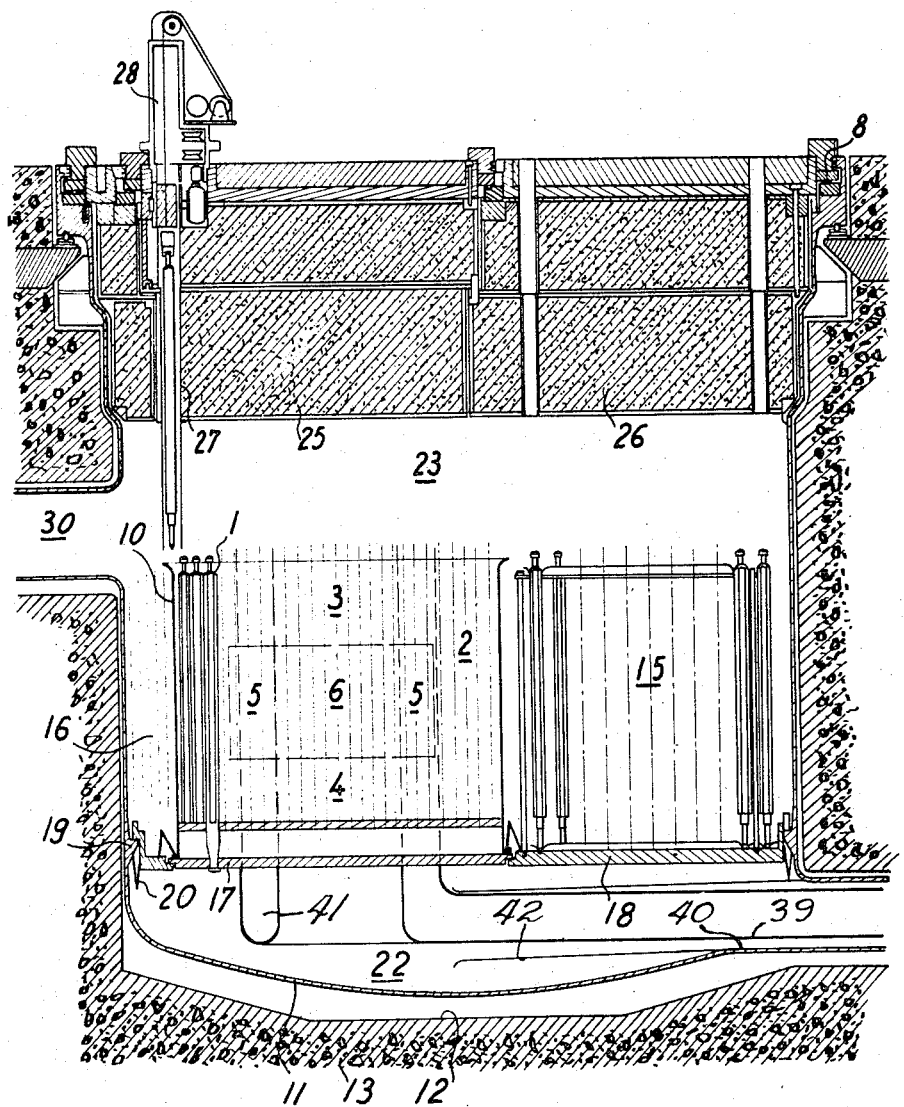
FIG. 1 is a vertical sectional view of the reactor according to the invention.
Figure 2:
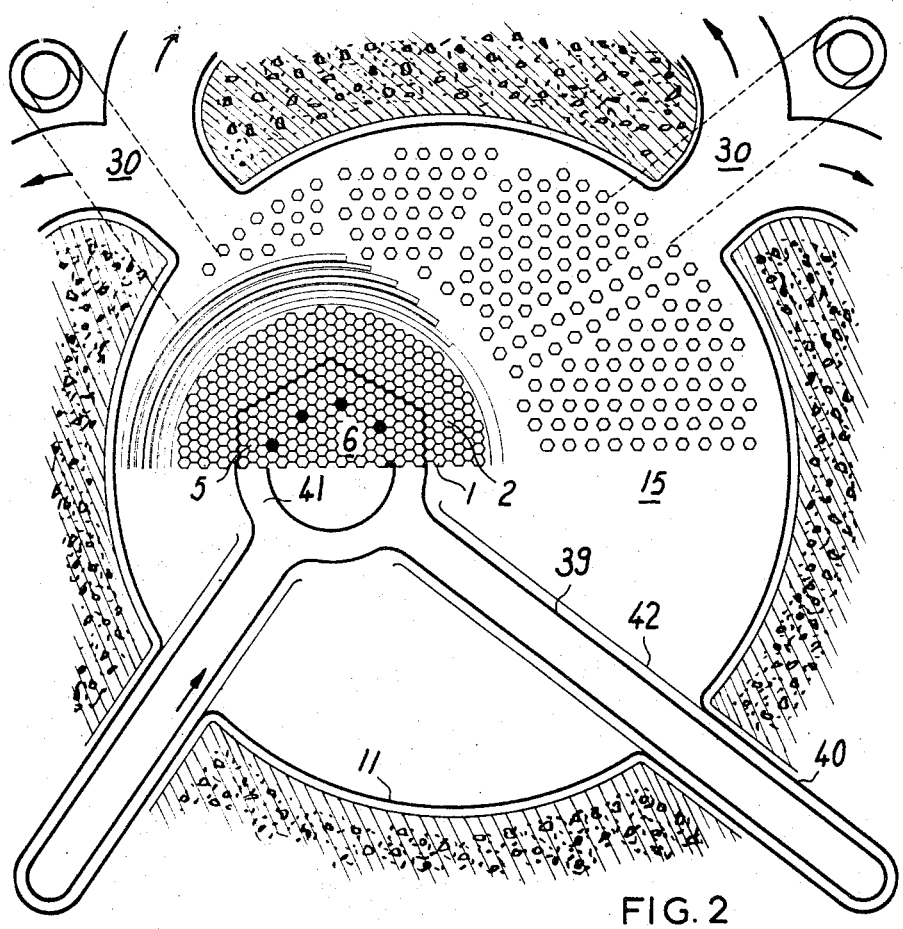
FIG. 2 represents two transverse half-sectional views of said reactor at two different levels which correspond respectively to the coolant supply and discharge pipes.
Figure 5:
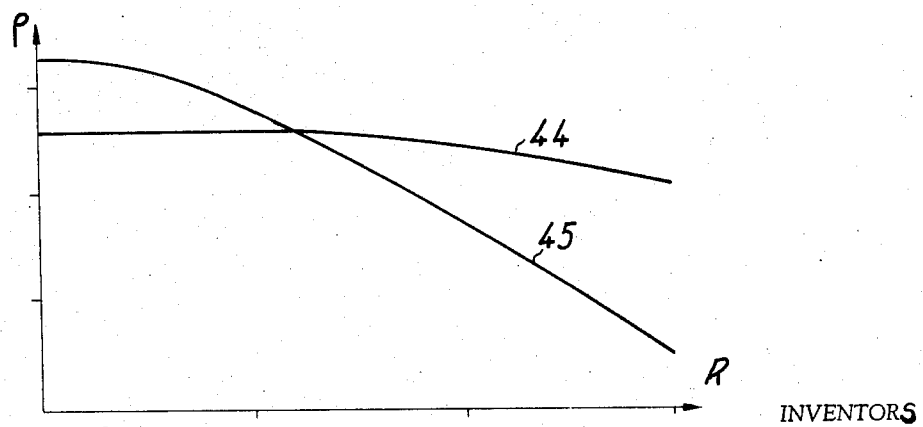

FIG. 5 clearly shows the flattening of the radial distribution of specific power obtained in accordance with the invention.

The reactor herein described is a breeder reactor comprising a core of fissionable fuel surrounded by a blanket of fertile material and cooled by circulation of liquid sodium.

The reactor core and blanket consist of assemblies of hexagonal shape such as the assembly 1 which contains pin-type elements of fuel or of fertile material between which liquid sodium circulates. The assemblies which are intended to form the radial blanket 2 contain only fertile pins, this material being, for example, natural uranium or depleted uranium in the form of oxide. The other assemblies contain fertile pins which are similar at the ends in order to form a top axial blanket 3 and bottom axial blanket 4; but the central portion of said assemblies contains pin-type elements of fissionable material which consists, for example, of a mixture of uranium oxide and plutonium oxide. The number of said pins is greater in the case of the assemblies which are intended to constitute the outer region 5 of the reactor core than those which form the inner region 6.

The combined assembly of fissionable and fertile assemblies is placed within a cylindrical tank 10 which is set off-center within a pressure vessel 11. Said pressure vessel, which is constructed of stainless steel and is of cylindrical shape with a dished end, is in turn suspended by its top portion within the interior of a safety vessel 12. Biological protection is ensured by means of boron-containing concrete 13.

The pressure vessel 11 is of relatively large size since the volume which is left free by the tank 10 constitutes a temporary storage zone 15 for fresh assemblies which are intended to be transferred into the reactor core or for irradiated assemblies in process of cooling. Steel neutron baffles 16 are interposed between the core assemblies and the pressure vessel 11 on the side which is adjacent the core, neutron shielding being provided on the side adjacent the storage zone 15 by means of structures which serve to support the assemblies.

The assemblies of the reactor proper and the storage assemblies are carried by diagrids 17 and 18 respectively which rest on a support ring 19 formed at the bottom of the pressure vessel 11. Leak-tightness between the diagrids and the pressure vessel is ensured by means of bellows-type seals 20 in such a manner that the diagrids 17 and 18 divide the pressure vessel 11 into a bottom compartment 22 and a top compartment 23 which contains the assemblies. The liquid-sodium coolant circulates through said assemblies from the bottom compartment 22 to the top compartment 23.

The pressure vessel 11 is closed at the top by means of two rotatable plugs 25 and 26 which are disposed in eccentric relation and the dimensions and arrangement of which are such as to correspond respectively to the reactor proper and to the storage zone. The combined movements of rotation of said two plugs makes it possible to exchange a core assembly for a storage zone assembly when the reactor is shut down. To this end, the small rotary plug 25 comprises a handling channel 27 so that an assembly which is being transferred can be lifted through said plug channel by means of a movable transfer machine 28. The removal of spent elements from and replacement of fresh fuel elements in the storage zone 15 is carried out by means of another handling machine (not shown) by way of channels provided in the large rotary plug 26 opposite each storage station; these operations are carried out during operation of the reactor.

Figure 3:
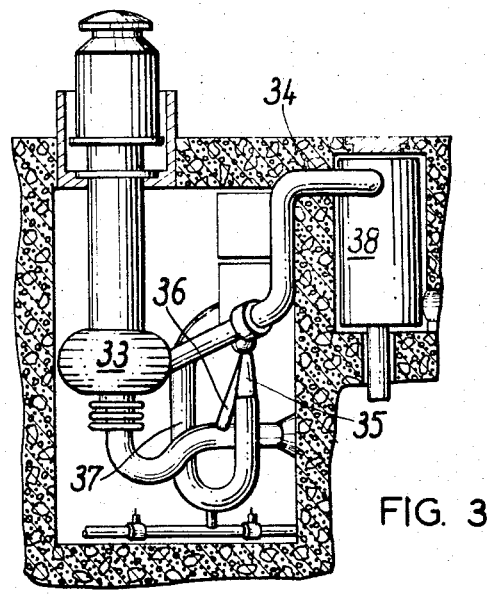
FIG. 3 illustrates one of the coolant loops.
Figure 4:
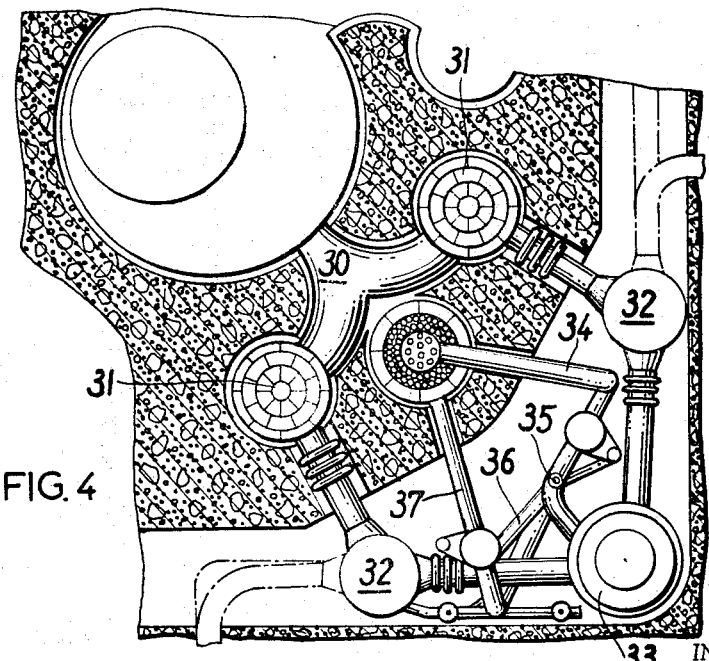
FIG. 4 is a plan view of the same coolant loop.

Cooling of the reactor is effected by means of four identical liquid sodium loops. One of these coolant loops is illustrated in FIGS. 3 and 4. The duct 30 through which the coolant flows out of the top compartment 23 of the pressure vessel is directed radially with respect to this latter. Said duct is divided into two branches which each open into a neutron trap 31 and supply the heat exchangers 32 in which the metal is cooled by heat transfer with the liquid metal of a secondary circuit, a portion of which is shown in chain-dotted lines in FIG. 4. The liquid sodium which passes out of the heat exchangers is drawn up by the circulating pump 33 and delivered by this latter into a high-pressure duct 34. Part of the flow of liquid passes into an ejector 35 which is disposed in the duct 34 and which draws off liquid metal from the suction side of the pump via the duct 36. The ejector 35 thus directs into a duct 37 a liquid metal which is at a lower pressure than that which prevails within the high-pressure duct 34. The ducts 34 and 37 open into a neutron trap 38 in two different zones of this latter.

At the outlet of the neutron trap 38, the liquid sodium at high pressure and low pressure which is derived from the ducts 36 and 37 flows into two supply pipes 39 and 40 which open into the bottom compartment 22 of the pressure vessel upstream of the assemblies. The two pipes referred to are coaxial and directed towards the axis of the reactor core.

The central pipe 39 effects the supply of high-pressure sodium to the assemblies of the outer region 5 of the reactor core. Said central pipe has its opening in an annular distributor 41 which is secured in leak-tight manner to the diagrid 17. The similar pipes of the three other loops also have their openings in this same annular distributor 41.

The external pipe 40 which serves to convey low-pressure sodium is connected to the outer containment vessel 11 but extends inside this latter in the form of a pipe 42 having a small thickness which serves to convey the sodium to the vicinity of the annular distributor 41. Thus, the low-pressure sodium passes through the diagrid 17 and accordingly effects the cooling of the assemblies which constitute the radial blanket 2 as well as the assemblies which constitute the inner region 6 of the reactor core. Being distributed within the bottom compartment 22, said low-pressure sodium also effects the cooling of the storage zone 15.

The high-pressure and low-pressure sodium circuits meet again on the outlet side of the assemblies in the top compartment 23. During normal operation, the sodium fills the entire pressure vessel, surrounds the lower portions of the plugs 25 and 26 and thus effects the cooling of these latter. If so required, the sodium can also serve to cool an irradiated assembly during transfer through the channel 27.

Within the outer zone 5 and also within the radial blanket 2, the flow rate of sodium which is circulated through each assembly increases in inverse ratio to the distance from that assembly to the axis of the reactor core. The distribution of the total flow rate is ensured by means of diaphragms provided at the foot of the assemblies.

FIG. 5 shows the distribution of specific power obtained by flattening in accordance with the invention by comparison with the distribution which corresponds to a reactor of conventional design. The distance from the axis R has been plotted as abscissae and the specific power P has been plotted as ordinates. Curve 44 corresponds to a conventional reactor and curve 45 corresponds to a reactor in accordance with the invention.

A flattening of the distribution of specific power as thus achieved accordingly results in better utilization of fissionable material and makes it possible for a same total power to make use of fuel pins of smaller diameter than those of conventional reactors, and thus to lower the cost of fabrication.

What we claim is:
1. A fast-neutron reactor designed to operate with a substantially uniform distribution of specific power, comprising:
   a liquid-tight tank;
   a core disposed in said tank;
   said core being divided into a center region containing fissionable material and a surrounding region containing fissionable material of the same enrichment, but having a higher volumetric proportion of fissionable material than the center region;
   a blanket region surrounding said core, containing fertile material;

an outlet duct connected to said tank for withdrawing coolant therefrom;

means for supplying coolant to the reactor with the coolant being supplied to the surrounding region of the core at a higher pressure than the coolant supplied to the center region of the core; and a heat exchanger and pump means for connecting said outlet duct to said coolant supply means.

2. A fast-neutron reactor designed to operate with a substantially uniform distribution of specific power, comprising:

a liquid-tight tank;

a core disposed in said tank;

said core being divided into a center region and a surrounding region;

said center region being occupied by elongated fuel assemblies containing fissionable material in their central portions and fertile material in their end portions;

said surrounding region being occupied by elongated fuel assemblies containing fissionable material of the same enrichment in their central portions, but having a higher volumetric proportion of fissionable material than the central portion of the assemblies in said center region, and containing fertile material in their end portions;

a blanket region surrounding said core, occupied by assemblies containing fertile material;

an outlet duct connected to said tank for withdrawing coolant therefrom;

a first inlet duct connected to said tank for supplying coolant to the central region of the core under pressure;

a second inlet duct connected to said tank for supplying coolant to the surrounding region of said core at a pressure higher than that present in said first inlet duct; and a heat exchanger and pump means for connecting the outlet duct to the inlet ducts and supplying coolant to said second inlet duct at a higher pressure than that supplied to said first inlet duct.

3. A nuclear reactor as defined in claim 2 wherein the center and surrounding core regions have symmetry of revolution with respect to a common axis parallel to the direction of flow of coolant within the reactor core.

4. A nuclear reactor as defined in claim 3 wherein the reactor is a converter reactor cooled by liquid sodium and wherein the first inlet duct also supplies coolant to the assemblies in the blanket region.

5. A nuclear reactor as defined in claim 2 wherein the first and second inlet ducts are concentric.

6. A nuclear reactor as defined in claim 2 wherein the reactor core includes means for varying the coolant flow rate transversely within a same region of the core.

References Cited

UNITED STATES PATENTS

| 3,180,802 | 4/1965 | West et al. | 176—61 X |
| 3,200,045 | 8/1965 | Vendryes et al. | 176—40 |
| 3,208,913 | 9/1965 | Hennig | 176—61 X |
| 3,212,985 | 10/1965 | Hackney | 176—61 X |

REUBEN EPSTEIN, *Primary Examiner.*